(12) United States Patent
Nagarajan et al.

(10) Patent No.: US 9,175,422 B2
(45) Date of Patent: Nov. 3, 2015

(54) POLYMER-MICELLE COMPLEX AS AN AID TO ELECTROSPINNING

(75) Inventors: Ramanathan Nagarajan, Newton, MA (US); Christopher P. Drew, Clinton, MA (US); Charlene M. Mello, Rochester, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1765 days.

(21) Appl. No.: 11/998,981

(22) Filed: Nov. 5, 2007

(65) Prior Publication Data

US 2009/0081457 A1    Mar. 26, 2009

Related U.S. Application Data

(60) Provisional application No. 60/881,712, filed on Jan. 22, 2007.

(51) Int. Cl.
| | | |
|---|---|---|
| *B29C 69/00* | (2006.01) | |
| *D01D 5/00* | (2006.01) | |
| *D01F 1/10* | (2006.01) | |

(52) U.S. Cl.
CPC *D01D 5/003* (2013.01); *D01F 1/10* (2013.01); *Y10T 428/298* (2015.01)

(58) Field of Classification Search
CPC ..... D01D 5/0985; D01D 5/0023; D01D 5/18; D01D 5/0038; D01D 5/0053; D01F 6/04; D01F 1/10; D01F 6/86; D01F 6/06; C11D 17/049; C11D 1/83; C11D 1/835; C11D 1/94; C11D 3/18; C11D 3/37; D04H 1/42

USPC .......................................................... 264/441
See application file for complete search history.

(56) References Cited

U.S. PATENT DOCUMENTS

| | | |
|---|---|---|
| 1,975,504 A | 10/1934 | Formhals |
| 4,043,331 A | 8/1977 | Martin et al. |
| 4,143,196 A | 3/1979 | Simm et al. |
| 4,323,525 A | 4/1982 | Bornat |
| 6,106,913 A | 8/2000 | Scardino et al. |
| 6,110,590 A | 8/2000 | Zarkoob et al. |

(Continued)

FOREIGN PATENT DOCUMENTS

WO    WO 2005/094868 A1    10/2005

OTHER PUBLICATIONS

Long et al, "Submicron Functional Fibrous Scaffolds based on electrospun phospholipids", Journal Material Chemistry, vol. 17, No. 7, Feb. 21, 2007, pp. 605-608.*

(Continued)

*Primary Examiner* — Elizabeth M Cole
(74) *Attorney, Agent, or Firm* — Roger C. Phillips

(57) ABSTRACT

A polymer-micelle complex suitable for use as an aid to preparing fibers, particularly nanofibers, by electrospinning. The polymer-micelle complex may be designed to impart viscosity, surface tension and conductivity properties optimal for electrospinning. By incorporating the complex as a secondary ingredient, one may electrospin sparingly soluble or low molecular weight polymers. Moreover, the polymer-micelle complex can be used as a generic carrier for preparing fibers incorporating other desired materials, such as rigid or globular (hard-to-spin) polymers, enzymes, cells, viral particles and nanoparticles.

8 Claims, 3 Drawing Sheets

(56) References Cited

U.S. PATENT DOCUMENTS

| | | | |
|---|---|---|---|
| 6,524,485 | B1 | 2/2003 | Dubin et al. |
| 6,800,155 | B2 | 10/2004 | Senecal et al. |
| 2001/0045547 | A1 | 11/2001 | Senecal et al. |
| 2002/0081732 | A1 | 6/2002 | Bowlin et al. |
| 2002/0096246 | A1 | 7/2002 | Sennet et al. |
| 2002/0124953 | A1 | 9/2002 | Sennett et al. |
| 2002/0173213 | A1 | 11/2002 | Chu et al. |
| 2003/0017208 | A1* | 1/2003 | Ignatious et al. ............. 424/486 |
| 2003/0065355 | A1 | 4/2003 | Weber |
| 2003/0100944 | A1 | 5/2003 | Laksin et al. |
| 2004/0137225 | A1* | 7/2004 | Balkus et al. ................ 428/364 |
| 2008/0213574 | A1* | 9/2008 | McKee et al. ................ 428/332 |

OTHER PUBLICATIONS

Jung et al, "Characterization of PVOH Nonwoven Mats Prepared from Surfactant-Polymer System via Electrospinning", Macromolecular Research, vol. 13, No. 5, pp. 385,390, Aug. 2005.*
Arayanarakul et al.,"Effects ofPoly( ethylene glycol), Inorganic Salt, Sodium Dodecyl Sulfate,and Solvent System on Electrospinning of Poly(ethylene oxide)," Macromol.Mater.
Meszaros et al., "Effect of Polymer Molecular Weight on the Polymer/Surfactant Interaction," 1. Phys. Chern. B, 109: 13538-44 (2005).
Li et al., "Electrospinning of Nanofibers: Reinventing the Wheel?," Adv. Mater., 16(14):1151-70 (2004).
Katti et al., "Bioresorbable Nanofiber-Based Systems for Wound Healing and DrugDelivery: Optimization of Fabrication Parameters," J. Biomed. Mater. Res., 70B:286-96 (2004).
Bernazzani et al., "On the Interaction of Sodium Dodecyl Sulfate with Oligomers of Poly(Ethylene Glycol) in Aqueous Solution," J. Phys. Chern. B, 108:8960-9 (2004).
Huang et al., "A review on polymer nanofibers by electrospinning and their applications in nanocomposites," Composites Science and Technology, 63:2223-53 (2003).
Mya et al., "Effect ofIonic Strength on the Structure of Polymer-Surfactant Complexes," 1. Phys. Chern. B, 107:5460-6 (2003).
Li et al., "Electrospun nanofibrous structure: A novel scaffold for tissue engineering," J. Biomed. Mater. Res., 60:613-21 (2002).
Jin et al., "Electrospinning Bombyx mori Silk with Poly(ethylene oxide)," Biomacromolecules, 3: 1233-39 (2002).
Zanette et al., The Role of the Carboxylate Head Group in the Interaction of Sodium Dodecanoate with Poly(ethylene oxide) Investigated by Electrical Conductivity Viscosity, and Aggregation Number Measurements, Journal of Colloid and Interface Science, 246:387-92 (2002).
Nagarajan, "Polymer-Surfactant Interactions," New Horizons: Detergents for the New Millenium Conference Invited Papers, published by American Oil Chemists Society and Consumer Specialty Products Association, Fort Myers, Florida (2001).
Barany, "Interaction between Water Soluble Polymers and Surfactants," Macromol. ~, 166:71-92 (2001).
Gasbarrone et al., "Interactions of short-chain surfactants with a nonionic polymer," Colloid Polvrn Sci, 279: 1192-9 (2001).
Wettig et al.,"Studies ofthe Interaction of Cationic Gemini Surfactants with Polymers and Triblock Copolymers in Aqueous Solution," Journal of Colloid and Interface Science, 244:377-385 (2001).
Nagarajan, "Association of nonionic polymers with micelles, bilayers, and microemulsions," J. Chern. Phys., 90(3): 1980-94 (1989).
Goddard, "Polymer-Surfactant Interaction Part I. Uncharged Water-Soluble Polymers and Charged Surfactants," Colloids and Surfaces, 19:255-300 (1986).
Nagarajan, "Thermodynamics of Non ionic Polymer-Micelle Association," Colloids and Surfaces, 13:1-17 (1985).
Nagarajan et al., "Viscometric Investigation of Complexes Between Polyethyleneoxide and Surfactant Micelles," Polymer Preprints, 23(1):41 et seq. (1982).

* cited by examiner

SEQUENCE LISTING

```
<160> NUMBER OF SEQ ID NOS: 3

<210> SEQ ID NO 1
<211> LENGTH: 6
<212> TYPE: PRT
<213> ORGANISM: Artificial Sequence
<220> FEATURE:
<221> NAME/KEY:
<223> OTHER INFORMATION: silk-like peptide block

<400> SEQUENCE: 1

Gly Ala Gly Ala Gly Ser
1               5

<210> SEQ ID NO 2
<211> LENGTH: 5
<212> TYPE: PRT
<213> ORGANISM: Artificial Sequence
<220> FEATURE:
<221> NAME/KEY:
<223> OTHER INFORMATION: elastin-like peptide block

<400> SEQUENCE: 2

Gly Val Gly Val Pro
1               5

<210> SEQ ID NO 3
<211> LENGTH: 5
<212> TYPE: PRT
<213> ORGANISM: Artificial Sequence
<220> FEATURE:
<221> NAME/KEY:
<223> OTHER INFORMATION: modified elastin-like peptide block

<400> SEQUENCE: 3

Gly Lys Gly Val Pro
1               5
```

POLYMER-MICELLE COMPLEX AS AN AID TO ELECTROSPINNING

CROSS-REFERENCE TO RELATED APPLICATIONS

The present application claims the benefit under 35 U.S.C. 119(e) of U.S. Provisional Patent Application Ser. No. 60/881,712, filed Jan. 22, 2007, the disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

The present invention relates generally to the electrospinning of fibers, especially nanofibers, and relates more particularly to an electrospinning aid that promotes the electrospinning of one or more desired materials into fibers, particularly nanofibers.

Nanofibers are fibers with a diameter in the nanoscale range, typically from about 10 nanometers to about several hundred nanometers. Because nanofibers possess many desirable physical and chemical properties, such as a high surface-to-volume ratio and an ability to be modified and/or functionalized, nanofibers are desirable in many different types of applications including, but not limited to, textiles, membrane systems, catalysis, immobilized enzymes, chemical and biological defense, fiber-reinforced composite materials, HEPA (High Efficiency Particulate Arrestance) filters, tissue engineering, wound healing, sensors and photonics. Examples of such applications are disclosed in the following patents and publications, all of which are incorporated herein by reference: U.S. Pat. No. 6,106,913, inventors Scardino et al., issued Aug. 22, 2000; U.S. Pat. No. 6,110,590, inventors Zarkoob et al., issued Aug. 29, 2000; U.S. Pat. No. 6,800,155 B2, inventors Senecal et al., issued Oct. 5, 2004; U.S. Patent Application Publication No. US 2001/0045547 A1, inventors Senecal et al., published Nov. 29, 2001; U.S. Patent Application Publication No. US 2002/0081732 A1, inventors Bowlin et al., published Jun. 27, 2002; U.S. Patent Application Publication No. US 2002/0096246 A1, inventors Sennet et al., published Jul. 25, 2002; U.S. Patent Application Publication No. US 2002/0124953 A1, inventors Sennett et al., published Sep. 12, 2002; U.S. Patent Application Publication No. US 2002/0173213 A1, inventors Chu et al., published Nov. 21, 2002; U.S. Patent Application Publication No. US 2003/0065355 A1, inventor Weber, published Apr. 3, 2003; U.S. Patent Application Publication No. US 2003/0100944 A1, inventors Laskin et al., published May 29, 2003; and Li et al., "Electrospun nanofibrous structure: A novel scaffold for tissue engineering," *J. Biomed. Mater. Res.*, 60:613-21 (2002); Huang et al., "A review on polymer nanofibers by electrospinning and their applications in nanocomposites," *Composites Science and Technology*, 63:2223-53 (2003); Katti et al., "Bioresorbable Nanofiber-Based Systems for Wound Healing and Drug Delivery: Optimization of Fabrication Parameters," J. Biomed. Mater. Res., 70B:286-96 (2004).

Nanofibers may be produced by a number of different techniques, such as interfacial polymerization, melt-spinning, and electrospinning. The basic process of electrospinning was invented about 70 years ago by Formhals and is disclosed in U.S. Pat. No. 1,975,504, which is incorporated herein by reference. Additional patents relating to electrospinning include U.S. Pat. No. 4,043,331, inventors Martin et al., which issued Aug. 23, 1977; U.S. Pat. No. 4,143,196, inventors Simm et al., which issued Mar. 6, 1979; and U.S. Pat. No. 4,323,525, inventor Bornat, which issued Apr. 6, 1982, all of which are incorporated herein by reference. Until about fifteen years ago, electrospinning had received relatively little attention as a process for producing very thin fibers. However, since that time, interest in electrospinning, particularly the electrospinning of nanofibers, has increased considerably. See, for example, Jin et al., "Electrospinning Bombyx mori Silk with Poly(ethylene oxide)," *Biomacromolecules*, 3:1233-39 (2002); Li et al., "Electrospinning of Nanofibers: Reinventing the Wheel?," *Adv. Mater.*, 16(14):1151-70 (2004); Arayanarakul et al., "Effects of Poly(ethylene glycol), Inorganic Salt, Sodium Dodecyl Sulfate, and Solvent System on Electrospinning of Poly(ethylene oxide)," *Macromol. Mater. Eng.*, 291:581-91 (2006), all of which are incorporated herein by reference.

Referring now to FIG. 1 of the present application, the technique of electrospinning is schematically shown. A quantity of a polymer solution 11 (such a polymer solution often referred to in the art as a "spin dope") is loaded into the barrel 13 of a syringe. A needle 15 is attached to the distal end of barrel 13, and a plunger 17, which may be driven by a pump (not shown), is inserted into the proximal end of barrel 13. As plunger 17 displaces solution 11 from barrel 13, a droplet of solution 11 becomes suspended from the tip of needle 15, where the droplet is held in place by surface tension forces. An electrode 19 from a high voltage power supply 21 is in contact with needle 15 and applies an electric potential thereto, which electric potential induces free charges in polymer solution 11. These free charges, in turn, introduce a tensile force in polymer solution 11. When the tensile force overcomes the surface tension associated with the pendant drop of polymer solution 11 at the tip of needle 15, a jet of polymer solution 11 is ejected from the tip of needle 15. Fluid mechanic analysis of this phenomenon suggests that the jet of polymer solution 11 experiences various instabilities depending upon the operating conditions and the properties of fluids. In most cases, the jet experiences a whipping instability giving rise to the bending and stretching of the jet. As the jet travels the short distance (typically about 20 cm) between the tip of needle 15 and a grounded collector 23, the contour length of the jet dramatically increases by orders of magnitude, and the jet thins to the nanometer scale. The solvent in the jet evaporates as the jet travels from the tip of needle 15 to collector 23. This evaporation of the solvent leaves dry nanofibers on the surface of collector 23. Typically, the dry nanofibers are deposited on the surface of collector 23 in the form of a nonwoven or random mat of nanofibers; however, it is also possible, for example, using a collector in the form of a rotating cylinder, to collect the nanofibers as a spool of nanofibers.

Uniform nanofibers are not typically produced from all polymer solutions. Instead, the morphology and other properties of an electrospun nanofiber may be influenced by one or more of the following: (i) properties of the polymer solution, such as viscosity, dielectric constant, surface tension, density and solvent vapor pressure, (ii) operational variables, such as the solution flow rate, the applied electric field and the electric current, and (iii) equipment variables, such as the needle size and the distance between the needle and the collector. The stability of the jet emitted from the needle depends on the viscous and viscoelastic properties of the polymer solution.

Polymer solutions of low viscosity tend to produce unstable jets that break into droplets and form beaded structures, as opposed to fibers. On the other hand, polymer solutions having reduced surface tension tend to form fibers, as opposed to beads. Also, fluid mechanic analysis has shown a direct dependence of the fiber diameter on the surface tension of the polymer solution. Moreover, electrical forces are responsible for the initiation of the jet and the stretching during whipping instability. Therefore, high solution conductivity and large solvent dielectric constant tend to favor thinner fibers.

Approximately 50 different polymers, some synthetic—some biological, have been used to form electrospun nanofibers. Various different solvents, some aqueous—others non-aqueous, have been used with these polymers to produce polymer solutions suitable for electrospinning. In the past, the primary consideration that has been used in selecting a solvent has been whether the polymer can dissolve in the solvent in a large enough concentration to make the solution sufficiently viscous. (As noted above, if the polymer solution is insufficiently viscous, the jet tends to break into droplets and form beaded structures, instead of fibers.) As a result, many polymers that have low aqueous solubility or that have low molecular weight do not typically generate the necessary viscosity in an aqueous solution and, instead, have been dissolved in non-aqueous solvents, if at all. Unfortunately, however, the use of many non-aqueous solvents is undesirable from an environmental point of view, especially if one considers the large-scale production of nanofibers.

SUMMARY OF THE INVENTION

It is an object of the present invention to provide an electrospinning aid that may be used to permit the electrospinning of one or more desired materials into fibers, particularly nanofibers.

The present invention is based on the discovery that, by including a suitable polymer-micelle complex in a spin dope, one can electrospin fibers to include materials that may not otherwise be capable of being electrospun into fibers, either in a particular solvent or in any solvent. Consequently, for example, sparingly soluble polymers, low molecular weight polymers, rigid or globular polymers, as well as other materials, such as nanoparticles, enzymes, cells, and viral particles, are now capable of being incorporated into electrospun fibers. One benefit of the invention is that, for example, if one wishes to electrospin fibers from an aqueous spin dope, as opposed to a non-aqueous spin dope, one can now do so.

Therefore, according to one aspect of the invention, there is provided a method of forming a fiber, the fiber including a desired material, the method comprising the steps of (a) providing a spin dope, the spin dope including (i) a solvent, (ii) a polymer-micelle complex, the polymer-micelle complex being present in the solvent in a quantity sufficient to enable the spin dope to be electrospun into a fiber, and (iii) a desired material present in the solvent; and (b) electrospinning the spin dope into a fiber comprising the desired material.

The present invention is also directed at fibers made by the aforementioned method and at the spin dope used in the aforementioned method.

Additional objects, as well as features and advantages, of the present invention will be set forth in part in the description which follows, and in part will be obvious from the description or may be learned by practice of the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
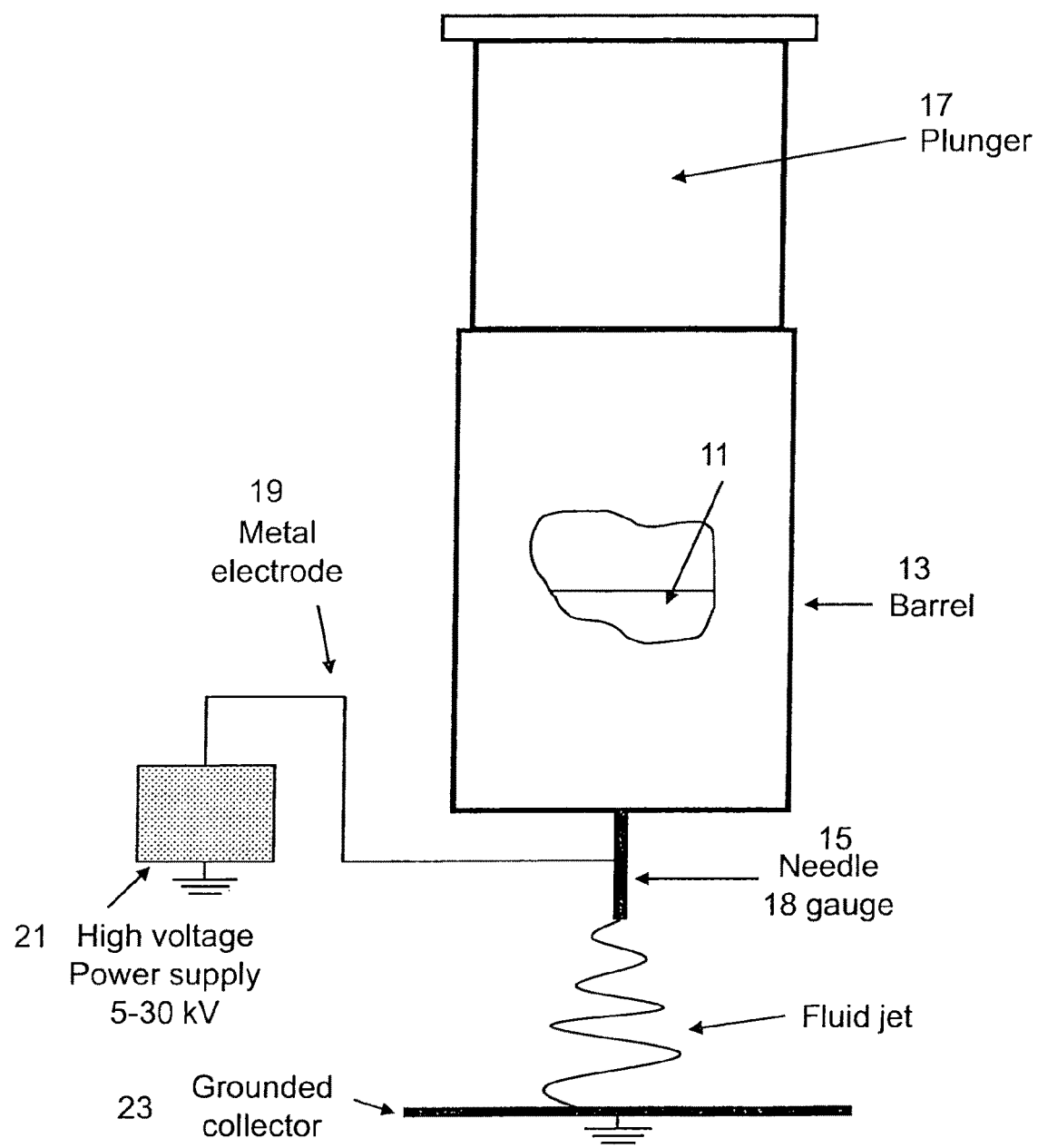
FIG. 1 is a simplified schematic diagram illustrating the technique of electrospinning.

The present invention is directed at the use of a polymer-micelle complex as an aid to electrospinning fibers. In particular, the present invention is based on the discovery that, by including a suitable polymer-micelle complex in a spin dope, one can electrospin fibers to include one or more materials that may not otherwise be capable of being electrospun into fibers, either in a particular solvent or in any solvent. Consequently, for example, materials that may not otherwise be electrospinnable into fibers from an aqueous spin dope may now be electrospun into fibers by including in the aqueous spin dope a polymer-micelle complex that is, itself, capable of being electrospun into fibers.

In view of the above, a spin dope according to the present invention includes the following components: (i) a solvent; (ii) an electrospinning aid in the form of a polymer-micelle complex dispersed in the solvent in a quantity sufficient to render the spin dope electrospinnable into fibers; and (iii) one or more materials of interest present in the solvent for incorporation into the electrospun fibers.

The solvent may be a pure solvent or may be a mixture of solvents. For the reasons discussed above, it may be desirable for the solvent to be water. However, the present invention is not limited to an aqueous solvent and may alternatively consist of or may additionally include one or more polar or non-polar non-aqueous solvents, such as, but not limited to, sulfuric acid, nitric acid, carbon tetrachloride, benzene, ortho-xylene, para-xylene, mixed xylene isomers, formic acid, dimethyl formamide, N,N-dimethyl formamide, N,N-dimethyl acetamide, chloroform, tetrahydrofuran, methylene chloride, ethanol, methanol, isopropanol, hydrochloric acid, camphorsulfonic acid, trifluoroacetic acid, dichloromethane, toluene, acetone, methylethylketone, carbon disulfide, hexafluoro-2-propanol, and hexafluoroisopropanol.

The surface tension of water is typically about 72 mN/m, which is generally not particularly favorable for generating thin, uniform fibers. On the other hand, water has a dielectric constant of about 78.4, which is favorable for charging the jet and electrostatic stretching to make thin fibers. The electrical conductivity of water depends on the extent to which ionic species are present therein. If, for example, salt is added to the water, the electrical conductivity will increase. (10 mM salt will result in a conductivity of about 60 mS/m.) For the non-aqueous solvents listed above, the surface tension is typically in the range of about 20 to 40 mN/m, the dielectric constant is typically in the range of about 5 to 40, and the electric conductivity is typically quite small, typically below about 4 mS/m (in most cases, below 1 mS/m).

As noted above, the electrospinning aid of the present invention is in the form of a polymer-micelle complex. Consequently, one needs to select a polymer and a surfactant that, when added to the particular solvent in question, will form a polymer-micelle complex and will render the spin dope suitable for electrospinning (for example, by making the spin dope appropriately viscous). The polymer may be a polymer that, even in the absence of the surfactant, is electrospinnable in the particular solvent selected, but this need not be the case. In fact, one of the benefits of employing a polymer-micelle complex in accordance with the present invention is that the range of solvents in which the polymer may be electrospun may be expanded. For example, by selecting an appropriate surfactant, a polymer that would not otherwise be electrospinnable from an aqueous solvent may be rendered electrospinnable. In fact, by virtue of the formation of a polymer-micelle complex, polymers that hitherto have not been capable of being electrospun may now be electrospinnable.

Figure 2A:
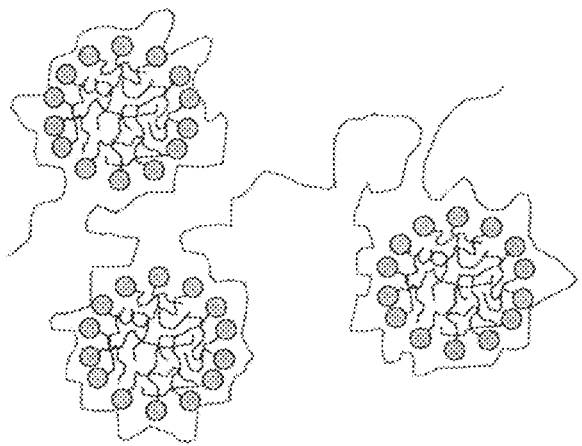
FIG. 2(a) is a schematic diagram, illustrating polymer-micelle complexation.

A schematic representation of the polymer-micelle complex involving a nonionic polymer, such as polyethylene oxide, and an ionic surfactant, such as sodium dodecyl sulfate, in water is presented in FIG. 2(a). As can be seen, the segments of the polymer molecule wrap around the surfactant micelles with the polymer segments partially penetrating the polar head group region of the micelles and reducing the micelle core-water contact. A single polymer molecule can interact with one or more micelles depending upon the molecular weight of the polymer. The size of the polymer-bound micelle depends on the nature of polymer-micelle interactions. The formation of polymer-micelle complex gives rise to gross conformational changes in the polymer molecule and resulting changes in solution viscosity. The ionic micelles make the nonionic polymer behave like a polyelectrolyte because of inter-micelle repulsions and contribute to significant expansion of the polymer coil upon complex formation. The solution viscosity thus dramatically increases. As the surfactant concentration continues to increase, the ionic strength of the solution also increases, which reduces the inter-micelle repulsions and causes a reduction in the magnitude of polymer expansion. As a result, the solution viscosity first increases, exhibits a maximum and then decreases with increasing concentration of the surfactant.

The polymer used in the polymer-micelle complex may consist of a single polymer species or may include a plurality of polymer species. Each such polymer may be a synthetic polymer or may be a naturally-occurring polymer, such as a polypeptide, DNA, or other biopolymer. Examples of polymers that may be used to form the polymer-micelle complex include, but are not limited to, the following: polyethylene oxide (PEO); polyvinyl pyrrolidone (PVP); polyvinyl alcohol (PVOH); polyamides (PA); polyurethanes (PU); polybenzimidazole (PBI); polycarboate (PC); polyacrylonitrile (PAN); polylactic acid (PLA); polyethylene-co-vinyl-acetate (PEVA); polymethacrylate (PMMA)/tetrahydroperfluorooctylacrylate (TAN); collagen-PEO; polyaniline (PANI)-PEO; PANI/polystyrene (PS); polyvinylcarbazole; polyethylene terephthalate (PET); polyacrylic acid-polypyrene methanol (PAA-PM); polystyrene (PS); polymethacrylate (PMMA); polyvinyl phenol; polyvinyl chloride (PVC); cellulose acetate (CA); polyacrylamide, collagen, silk; polycaprolactone; poly(2-hydroxyethyl methacrylate); poly(vinylidene fluoride); polyether imide; poly(lactide-co-glycolide); hydroxylpropyl cellulose (HPC); polypropylene oxide (PPO); ethyl hydroxyethyl cellulose (EHEC); and polymetha-phenylene isophthalamide.

The surfactant used in the polymer-micelle complex may consist of a single surfactant species or may include a plurality of surfactant species. The surfactant is present in the spin dope in a quantity sufficient not only to form micelles but also to cause polymer-micelle complexation to an extent needed to increase the viscosity of the spin dope, as compared to a corresponding spin dope lacking the surfactant. Depending upon the type of solvent and the type of polymer, examples of suitable surfactants may include ionic surfactants, such as, but not limited to, fluorocarbon surfactants, alkyl aryl sulfonates (e.g., alkylbenzenesulfonates), polyalkoxy carboxylates, N-acylsarcosinates, acylated protein hydrolysates, short-chain alkylarenesulfonates, lignosulfonates, napththalenesulfonates, α-olefinsulfonates, petroleum sulfonates, dialkyl sulfosuccinates, amidosulfonates, 2-sulfoethyl esters of fatty acids, fatty acid ester sulfonates, alcohol sulfates, ethoxylated alcohol sulfates, sulfated alkylphenol ethoxylates, sulfated acids, amides, and esters, sulfated natural oils and fats, phosphate esters, and the like, and combinations thereof, and nonionic surfactants, such as, but not limited to, alcohol ethoxylates, alkylphenol ethoxylates, glycerol esters, polyoxyethylene esters, ethoxylated anhydrosorbitol esters, natural ethoxylated fats, oils, and waxes, glycol esters of fatty acids, alkyl polyglycosides, diethanolamine condensates, monoalkanolamine condensates, polyoxyethylene fatty acid amides, fatty acid glucamides, polyalkylene oxide block copolymers, poly(oxyethylene-co-oxypropylene) and combinations thereof. For purposes of the present invention, a micelle may include a mixture of surfactant species, such as a mixture of ionic surfactant molecules and nonionic surfactant molecules.

The choice of the surfactant mainly controls the surface tension of the spin dope since the surface tension reduction with the surfactant is much larger than the reduction achieved with the polymer alone. For example, compared to a surface tension of about 72 mN/m for water, a solution containing polymer-SDS micelles may have a surface tension of about 35 mN/m. Typically, surface tension values in the range of 30 to 40 mN/m are attainable with hydrocarbon type surfactants. If fluorinated surfactants are used, then surface tensions in the range of 17 to 24 mN/m can be achieved. The conductivity of the aqueous solution depends on the concentration of the surfactant. For aqueous solutions of SDS, the electrical conductivity has been measured to be about 33 mS/m at 5 mM SDS, 60 mS/m at 10 mM SDS, and 75 mS/m at 16 mM SDS. Similar values are achieved for various ionic surfactants, both of the hydrocarbon type and the fluorocarbon type. Thus, the solution containing polymer-micelle complex can be designed to have viscosity, surface tension and conductivity properties covering a wide range, suitable for electrospinning, by the choice of the polymer-micelle complex system.

The various conditions under which polymer-micelle complexes form have been extensively studied, as exemplified by the following documents, all of which are incorporated herein by reference: U.S. Pat. No. 6,524,485 B1, inventors Dubin et al., which issued Feb. 25, 2003; Nagarajan et al., "Viscometric Investigation of Complexes Between Polyethyleneoxide and Surfactant Micelles," *Polymer Preprints,* 23(1):41 et seq. (1982); Nagarajan, "Thermodynamics of Nonionic Polymer-Micelle Association," *Colloids and Surfaces,* 13:1-17 (1985); Goddard, "Polymer-Surfactant Interaction Part I. Uncharged Water-Soluble Polymers and Charged Surfactants," *Colloids and Surfaces,* 19:255-300 (1986); Nagarajan, "Association of nonionic polymers with micelles, bilayers, and microemulsions," J. Chem. Phys., 90(3): 1980-94 (1989); Nagarajan, "Polymer-Surfactant Interactions," New Horizons: Detergents for the New Millenium Conference Invited Papers," published by American Oil Chemists Society and Consumer Specialty Products Association, Fort Myers, Fla. (2001); Bárány, "Interaction between Water Soluble Polymers and Surfactants," *Macromol. Symp.*, 166:71-92 (2001); Gasbarrone et al., "Interactions of short-chain surfactants with a nonionic polymer," *Colloid Polym Sci*, 279:1192-9 (2001); Wettig et al., "Studies of the Interaction of Cationic Gemini Surfactants with Polymers and Triblock Copolymers in Aqueous Solution," *Journal of Colloid and Interface Science*, 244:377-385 (2001); Zanette et al., "The Role of the Carboxylate Head Group in the Interaction of Sodium Dodecanoate with Poly(ethylene oxide) Investigated by Electrical Conductivity, Viscosity, and Aggregation Number Measurements," *Journal of Colloid and Interface Science*, 246:387-92 (2002); Mya et al., "Effect of Ionic Strength on the Structure of Polymer-Surfactant Complexes," *J. Phys. Chem. B.* 107: 5460-6 (2003); Bernazzani et al., "On the Interaction of Sodium Dodecyl Sulfate with Oligomers of Poly(Ethylene Glycol) in Aqueous Solution," *J. Phys. Chem. B*, 108:8960-9 (2004); and Mészáros et al., "Effect of Polymer Molecular Weight on the Polymer/Surfactant Interaction," *J. Phys. Chem. B*, 109:13538-44 (2005). Consequently, one of ordinary skill in the art will be able to determine readily which combinations of polymers and surfactants are appropriate for use with a given solvent in order to render a spin dope electrospinnable.

The one or more materials of interest added to the spin dope may include, but are not limited to, sparingly soluble or low molecular weight polymers, rigid or globular (hard-to-spin) polymers, enzymes, cells, drugs, viral particles and nanoparticles. In general, any material that can be added to the spin dope and remain dispersed therein during electrospinning may be used. In fact, if desired, the material may be contained within the micelle, itself, which may be desirable if the material is a drug, an enzyme or other material whose activity one wishes to control. Hard-to-spin polymers include, but are not limited to, repeat sequence protein polymers (RSPPs), for example, those described in WO 2005/094868, published Oct. 13, 2005, which is hereby incorporated by reference in its entirety. The repeating units also may be derived from naturally occurring proteins and synthetic repeating amino acid sequences units may be utilized as well, such as silk-elastin polymers and copolymers (SELP). SELP47K finds use as a repeat sequence protein polymer of the present invention, and is a homoblock protein polymer that consists exclusively of silk-like crystalline blocks and elastin-like flexible blocks. SELP47K is 70% proline, valine, and alanine. Other silk-elastin polymer examples and variants include, but are not limited to, SELP 47E, SELP 47R, SELP 47K, SELP 47E, SELP 27K, SELP37K, SELP 67K, and SELP 58. The repeat sequence protein polymers, including SELPs, may be obtained or produced as described in WO 2005/094868.

It should be understood that, although the present invention is particularly advantageous when used to electrospin materials that, in the absence of the polymer-micelle complex, are not electrospinnable into fibers in the particular solvent being used, the one or more materials of interest are not so limited and may include materials that, in the absence of the polymer-micelle complex, may be electrospun into fibers in the particular solvent being used.

The following examples are provided for illustrative purposes only and are in no way intended to limit the scope of the present invention:

EXAMPLE 1

Figure 2B:
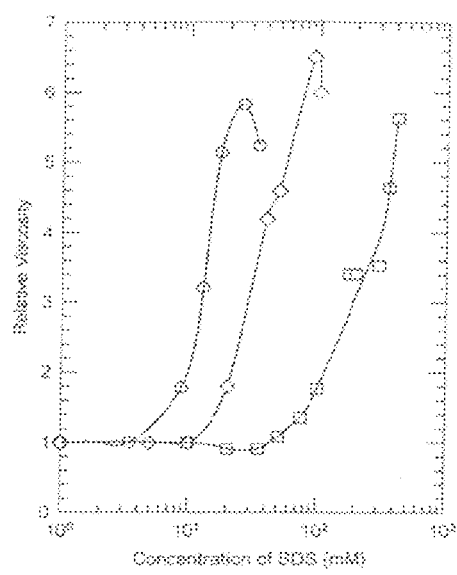
FIG. 2(b) is a graph, depicting the changes in relative viscosity for a spin dope as a function of surfactant concentration for polymers of different molecular weights.

The relative viscosities of a number of polyethylene oxide-surfactant solutions (relative viscosity being defined as the ratio between the viscosity of the polymer and surfactant solution and the viscosity of the polymer solution, both at the same polymer concentration) were determined experimentally. The results are plotted in FIG. 2(b) as a function of the surfactant concentration for the anionic surfactant sodium dodecyl sulfate interacting with different molecular weights and concentrations of polyethylene oxide. (The circles represent a high molecular polymer, the squares represent a low molecular weight polymer, and the diamonds represents an intermediate molecular weight polymer.)

As can be seen, the viscosity data show that the polymer molecular weight, polymer concentration, and surfactant concentration are variables that can be manipulated to obtain any desired viscosity value. In general, the lower the polymer molecular weight, the higher the polymer and surfactant concentrations are needed to attain the same viscosity level.

EXAMPLE 2

To illustrate how a polymer-micelle complex may be used as an aid to electrospinning, Applicants investigated the electrospinning of a gel forming, silk-elastin biopolymer, SELP (Genencor International, Inc., Rochester, N.Y.). SELP is a genetically engineered repeat block of copolymer of protein sequences representative of silk and elastin. It has the structure $H_2N$—$(S_3E_3E_KE_4S_3)_{1-13}$—COOH, where S stands for the silk-like peptide block GAGAGS (SEQ ID NO: 1), E stands for the elastin-like peptide block GVGVP (SEQ ID NO: 2) and $E_K$ stands for the modified elastin-like peptide block, GKGVP (SEQ ID NO: 3). The molecular weight of the polymer is about 70,000 Dalton. The protein polymers are water-soluble and they form irreversible gels due to physical interactions if the polymer concentration is large enough—even at ambient temperatures. The rate of gelation is dependent on the polymer composition, concentration, temperature and other solution conditions. The gelation is indeed exploited for developing the polymer gels for controlled drug delivery applications. However, the onset of gel formation is sufficient to cause problems with electrospinning. Gelation is avoided or at least the rate of gelation is retarded only when the aqueous phase concentration is decreased. However, this would cause the solution viscosity to also decrease below a level suitable for electrospinning.

Figure 3A:
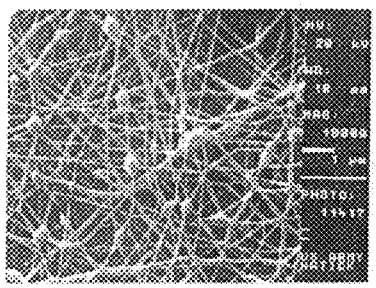
FIGS. 3(a) through 3(e) are SEM images of electrospun nanofibers produced according to various experiments described in Example 2.
Figure 3B:
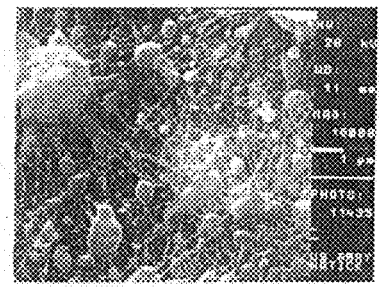

SELP biopolymer is soluble in formic acid without the formation of any gels. Applicants have electrospun SELP from a 15 weight percent solution in formic acid using a set-up shown in FIG. 1. The applied voltage was 20 kV and the polymer solution flow rate was maintained at 120 μl/h. The distance between the nozzle end and the collector surface was approximately 15 cm, and a grounded aluminum foil was used as the collector. Nanofibers of 200 to 300 nm diameter were produced as shown by the SEM image in FIG. 3(a). No bead formation was observed. One can observe a few spots where fiber-fiber contact had occurred between not fully dry fibers. Applicants have electrospun the same system but at a lower polymer concentration of about 8 weight percent such that the viscosity of the solution will be lower. The resulting electrospun nanofibers are shown in FIG. 3(b). One can see significant presence of beads forming in the system.

Figure 3C:
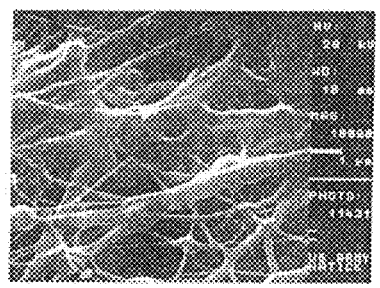

An aqueous solution of SELP was prepared at about 6.7 weight percent for which no gelation was observed over the duration of our experiments. However, the solution viscosity was quite small and this could not be processed into fibers by electrospinning. Applicants added 2.1 weight percent polyethylene oxide (MW=900,000) and 1 weight percent sodium dodecyl sulfate (approximately 35 mM) to this solution. The polymer-micelle complex formation was spontaneous and the solution became significantly viscous. The polymer PEO contributed to increasing the solution viscosity so that fibers could be generated in preference to beads. The addition of the surfactant SDS increased the solution viscosity further by the formation of extended PEO-SDS micelle complexes, decreased the surface tension of the solution, increased the solution conductivity and also increased the clouding/gelation temperatures, thus retarding any possible gelation. Nanofibers in the size range 200 to 300 nm in diameter were formed as shown by the SEM image in FIG. 3(c).

Figure 3D:
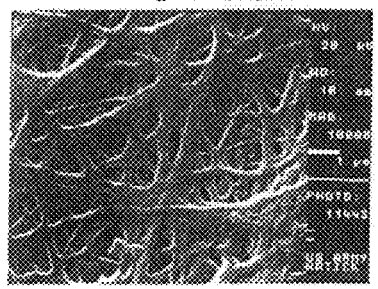
Figure 3E:
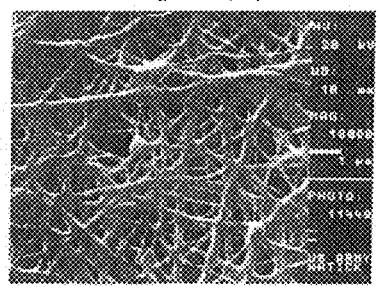

To make the above-described fibers resistant to contact with water, the secondary structure of silk-like blocks was modified to induce formation of a larger fraction of hydrogen-bonded beta sheets or beta strands. This was done by treatment of the fibers with methanol. As shown in FIG. 3(d), the nanofiber morphology of the treated fibers was not significantly modified. The fibers were swollen somewhat compared to the untreated fibers. An alternate approach involved thermal annealing. In this approach, the fibers were thermally annealed at 140 C for 30 minutes, which resulted in some fiber swelling but no gross changes in fiber morphology as can be seen from the SEM image in FIG. 3(e).

In these preliminary experiments, no attempt has been made to optimize the polymer-micelle complex. It is clear from FIG. 2(b) that, by choosing a higher molecular weight PEO, one can formulate an electrospinnable aqueous solution at much lower concentrations of both PEO and SDS.

It may be desirable to use a very high molecular weight polymer in applications where one wishes to electrospin polymers of low molecular weights, polymers with low aqueous solubilities, or polymers that have rigid or globular chain elements. This will keep the polymer-micelle complex as a secondary ingredient with relatively small mass fractions. In the above example, the polymer-micelle complex accounts for a mass fraction of about 0.32 in the total solids; however, by using a PEO of about MW=$5 \times 10^6$, the polymer-micelle mass fraction could have been reduced to less than 0.10. For applications where one wishes to electrospin proteins and nanoparticles, it may desirable to use polymers of a lower molecular weight. This will allow an adequate amount of solid material to be available to act as the template to incorporate the compact proteins and nanoparticles.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of forming a fiber, the fiber consisting essentially of one or more desired materials, the method comprising:
   (a) providing a spin dope, the spin dope comprising:
      (i) a solvent,
      (ii) a polymer-micelle complex, the polymer-micelle complex being present in the solvent in a quantity sufficient to enable the spin dope to be electrospun into a fiber and wherein the polymer-micelle complex is present in the solvent as a minor component in a quantity of about 0.32 in mass fraction of total solids of the spin dope, wherein the polymer-micelle complex consists essentially of polyethylene oxide and sodium dodecyl sulfate, and
      (iii) one or more desired materials present in the solvent; and
   (b) electro spinning the spin dope into a fiber consisting essentially of the one or more desired materials.

2. The method as claimed in claim 1 wherein the solvent consists of water.

3. The method as claimed in claim 1 wherein the solvent comprises water.

4. The method as claimed in claim 3 wherein the solvent further comprises a non-aqueous solvent.

5. The method as claimed in claim 1 wherein the solvent consists of at least one non-aqueous solvent.

6. The method as claimed in claim 5 wherein the at least one non-aqueous solvent is selected from the group consisting of sulfuric acid, nitric acid, carbon tetrachloride, benzene, ortho-xylene, para-xylene, mixed xylene isomers, fonnic acid, dimethyl formamide, N,N-dimethyl formamide, N,N-dimethyl acetamide, chloroform, tetrahydrofuran, methylene chloride, ethanol, methanol, isopropanol, hydrochloric acid, camphorsulfonic acid, trifluoroaceticacid, dichloromethane, toluene, acetone, methylethylketone, carbon disulfide, hexafluoro-2-propanol, and hexafluoroisopropanol.

7. The method as claimed in claim 1 wherein the one or more desired materials are selected from the group consisting of sparingly soluble or low molecular weight polymers, rigid or globular polymers, enzymes, cells, drugs, viral particles and nanoparticles.

8. The method as claimed in claim 1 wherein the one or more desired materials are contained within the micelle of the polymer-micelle complex.

* * * * *